United States Patent
Jones (10) Patent No.: US 10,757,704 B2
(45) Date of Patent: Aug. 25, 2020

(54) FREQUENCY BAND SELECTION

(71) Applicant: T-Mobile USA, Inc., Bellevue, WA (US)

(72) Inventor: David Jones, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 145 days.

(21) Appl. No.: 16/104,759

(22) Filed: Aug. 17, 2018

(65) Prior Publication Data

US 2020/0059929 A1 Feb. 20, 2020

(51) Int. Cl.
*H04W 72/04* (2009.01)
*H04W 84/12* (2009.01)
*H04W 88/02* (2009.01)

(52) U.S. Cl.
CPC ... *H04W 72/0453* (2013.01); *H04W 72/0473* (2013.01); *H04W 84/12* (2013.01); *H04W 88/02* (2013.01)

(58) Field of Classification Search
CPC ............... H04W 72/0453; H04W 72/0473
See application file for complete search history.

(56) References Cited

U.S. PATENT DOCUMENTS

| | | | | |
|---|---|---|---|---|
| 2002/0132585 A1* | 9/2002 | Palermo | ............... | H04M 1/727 455/41.1 |
| 2008/0039089 A1* | 2/2008 | Berkman | ............... | H04W 36/04 455/436 |
| 2008/0117871 A1* | 5/2008 | Olexa | ...................... | H04B 7/12 370/329 |
| 2013/0040651 A1* | 2/2013 | Derneryd | ............... | H04W 16/28 455/452.1 |
| 2013/0078924 A1* | 3/2013 | Choudhury | ........... | H04W 16/14 455/62 |
| 2014/0235238 A1* | 8/2014 | Pais | ...................... | H04W 8/005 455/434 |
| 2015/0280847 A1* | 10/2015 | Somasundaram | .... | H04L 5/0048 370/252 |
| 2015/0289270 A1* | 10/2015 | Knapp | ............... | H04W 72/0453 455/452.1 |
| 2015/0289276 A1* | 10/2015 | Goussard | ............... | H04W 84/12 370/252 |

(Continued)

FOREIGN PATENT DOCUMENTS

| KR | 20140003424 A | 1/2014 |
|---|---|---|
| KR | 20170081216 A | 7/2017 |
| WO | WO2017030743 A1 | 2/2017 |

OTHER PUBLICATIONS

The PCT Search Report and Written Opinion dated Nov. 13, 2019, for PCT Application No. PCT/US2019/044154, 13 pages.

*Primary Examiner* — Jael M Ulysse
(74) *Attorney, Agent, or Firm* — Lee & Hayes, P.C.

(57) ABSTRACT

A base station or other device may have access to multiple channels for communicating with a mobile device or other client device. In some cases, these channels may include high power channels and low power channels, where the high power channels are in frequency bands in which higher power signals are legally allowed relative to those of channels in other frequency bands. When allocating bandwidth for use in communicating with the mobile device, the base station is configured to preferentially use channels using relatively low power signals over channels that use relatively high power signals.

17 Claims, 3 Drawing Sheets

(56) References Cited

U.S. PATENT DOCUMENTS

| | | | |
|---|---|---|---|
| 2016/0014746 A1* | 1/2016 | Ode | H04L 5/001 370/330 |
| 2016/0057186 A1* | 2/2016 | Jose | H04W 64/00 370/312 |
| 2016/0095125 A1* | 3/2016 | Park | H04W 72/02 370/329 |
| 2017/0026951 A1* | 1/2017 | Lou | H04L 5/001 |
| 2017/0055159 A1* | 2/2017 | Boppana | H04B 1/40 |
| 2017/0171870 A1* | 6/2017 | Wang | H04W 52/367 |
| 2017/0251380 A1* | 8/2017 | Schabel | H04W 16/14 |
| 2018/0279333 A1* | 9/2018 | Fischer | H04W 24/02 |

* cited by examiner

FREQUENCY BAND SELECTION

BACKGROUND

Cellular communication systems have generally operated using radio frequencies that are licensed by regulatory authorities. Increasing usage of cellular communication systems, however, has increased the demand for radio frequencies. To address this need, authorities in some countries have made certain unlicensed spectrums available for use by cellular communication systems. In the United States, for example, certain frequency bands in the range of 5.15 Gigahertz (GHz) to 5.825 GHz can be legally used without license by wireless carriers. Long-Term Evolution (LTE) systems that use unlicensed frequencies do so in accordance with standards and techniques that are referred to as LTE-Unlicensed (LTE-U) access or Licensed Assist Access (LAA).

The 5 GHz unlicensed bands are used by various types of devices. Significantly, the 5 GHz unlicensed bands are used by various types of Wi-Fi devices that communicate wirelessly in accordance with IEEE 802.11 standards and protocols. Wi-Fi devices are commonly used by both businesses and homes for various types of communications, and are frequently used to implement access points through which wireless devices such as personal computers and tablet computers can access the Internet and other networks. Accordingly, the unlicensed 5 GHz bands can often be relatively congested.

Because the use of the unlicensed bands is shared by multiple devices, cellular communication systems must take measures to avoid interfering with other users of the bands. Components of cellular communication systems are often configured so that they use channels of the unlicensed bands only during times when these channels are not otherwise in use, such as between transmissions of other devices. As a result, given a channel bandwidth, a cellular system may only be able to use a fraction or percentage of that bandwidth.

A communication session established by a cellular carrier can use channel aggregation, in which session communications are carried by multiple channels. These channels can be within a single band or in multiple bands. In some cellular systems, a session may use a primary link and one or more supplemental links. The primarily link is typically established through a channel of a licensed band. A supplemental link can be established through a channel of either a licensed or unlicensed band.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques for allocating available bandwidth of licensed and unlicensed frequency bands for communication sessions with devices such as smartphones, tablet computers, and other types of wireless communications equipment.

In a described embodiment, the base station of a cellular communication network uses channel aggregation to communicate with a mobile device using two or more communication links. The links may be established through different channels, which may be in different frequency bands, and each of the frequency bands may be subject to different regulatory restrictions. For example, relatively high power signals may be allowed in one frequency band while signals within another frequency band are limited by regulation to use relatively low power.

In certain embodiments, the frequency bands may include both licensed frequency bands and unlicensed frequency bands. Licensed bands are those that have been licensed for exclusive use by the operator of the cellular communication system in return for a licensing fee. Unlicensed bands, on the other hand, are designated by government regulation for shared use by multiple communication networks, usually without any fee requirement. Unlicensed bands are frequently also used by Wi-Fi networks that are implemented in accordance with IEEE 802.11 standards and protocols.

In the United States, the unlicensed spectrum is referred to as the Unlicensed National Information Instructure (UNII) spectrum. The UNII spectrum includes several sub-bands in the 5 GHz frequency band, including sub-bands that are referred to as the UNII-1 sub-band, the UNII-2 sub-band, and the UNII-3 sub-band.

Permissible uses of these sub-bands vary. For example, the UNII-1 and UNII-3 sub-bands can be used with signals of up to 36 dBm EIRP, while the UNII-2 sub-band is limited to signals of no more than 30 dBm EIRP. Accordingly, greater range is possible when using the UNII-1 and UNII-3 sub-bands in comparison to the UNII-2 sub-band. However, the UNII-1 and UNII-3 sub-bands are used more heavily due to their greater range, and may therefore be relatively congested.

In the described embodiment, a base station and/or a mobile device may monitor congestion of channels in the unlicensed sub-bands so that otherwise unused bandwidth can be allocated for use in communication sessions between the base station and the mobile device. Channels and channel bandwidth may be allocated dynamically to account for changing conditions such as changing locations of the mobile device and changing levels of congestion on different channels and frequency bands.

In accordance with certain embodiments, preference among unlicensed sub-bands is given to the sub-bands that are subject to lower power limits, such as the UNII-2 sub-band, when allocating bandwidth for a communication session. These sub-bands generally have less congestion than sub-bands for which higher power signals are allowed, such as the UNII-1 and UNII-3 sub-bands, and may be used for communication sessions with devices that are within range of the lower power signals.

For example, when allocating bandwidth for a communication session with a mobile device, the base station may determine whether the mobile device is within the coverage range of a channel that is operating on a low-power unlicensed sub-band. If the mobile device is within the coverage range, bandwidth is preferentially allocated from the low-power unlicensed sub-band. Otherwise, the bandwidth can be allocated from a channel of a high-power unlicensed sub-band or of a licensed band. This scheme effectively saves the more limited availability of the high-power unlicensed sub-bands for the devices that are unable to communicate using the relatively less congested low-power sub-bands. This allows a base station to accommodate a larger number of users than might otherwise be possible.

Figure 1:
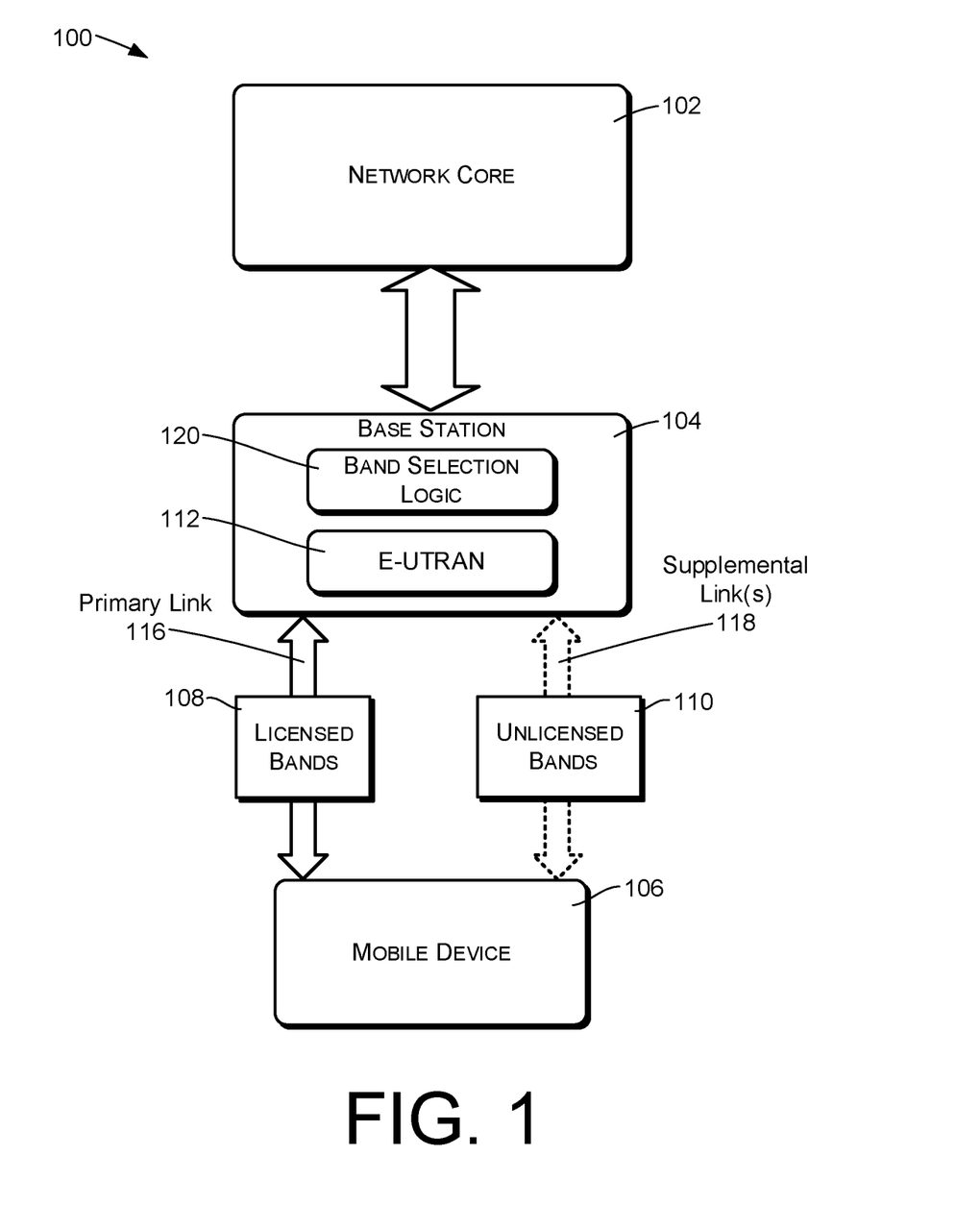
FIG. 1 is a block diagram of a communication network that selects between different frequency bands for communication sessions with wireless devices.

FIG. 1 shows an example mobile communication network 100. As an example, the mobile communication network 100 might comprise a Long-Term Evolution (LTE) network such as used in cellular communication systems.

The network 100 includes a network core 102, which may in some embodiments comprise an LTE network core and/or IP-Multimedia Subsystem (IMS) core. The network 100 includes a radio access network (RAN) that comprises multiple geographically distributed base stations 104, only one of which is shown in FIG. 1 for purposes of explanation. Each base station 104 has one or more radio transceivers and associated antennas (not shown) for communicating with multiple mobile devices 106, only one of which is shown in FIG. 1 for purposes of explanation.

The mobile device 106 may be a cellular handset or other device having wireless communication capabilities. For example, the mobile device 106 may comprise a smartphone, a tablet computer, a laptop computer, a media device, a wearable device, an equipment or device controller, etc. Although described as being mobile for purposes of discussion, the device represented by the mobile device 106 may also alternatively comprise a stationary device or component that uses wireless technologies for communications with the network core 102 through the base station 104.

During operation, the mobile device 106 establishes a communication session with the network core 102 through the base station 104. The communication session may be used to convey various types of data, including voice data. In LTE systems, communications are performed using a packet-based protocol, such as the Internet Protocol (IP), in which multiple data packets are exchanged with the mobile device 106.

In some embodiments, the base station 104 may communicate over licensed frequency bands 108 and unlicensed frequency bands 110 using LTE-Unlicensed (LTE-U) access or Licensed Assist Access (LAA). Furthermore, channel aggregation may be used so that a single communication session may use multiple channels, each of which may be in a different frequency band.

Among other components that are not shown in FIG. 1, the base station 104 may have an E-UTRAN radio transceiver 112. In certain embodiments, the E-UTRAN radio transceiver 112 is used for communicating with devices in the licensed frequency bands 108 and the unlicensed frequency bands 110, in accordance with any of various IEEE 802.11 communication protocols.

The licensed bands 108 may include bands that have been licensed (often for a fee) from a government agency such as the Federal Communications Commission (FCC) in the United States. The unlicensed frequency bands 110 may include bands that are made available without charge and that are legally regulated for shared use by multiple communication networks.

More specifically, in the United States the licensed bands 108 may comprise ultra-high frequency (UHF) bands that are referred to as the 850 megahertz (MHz), 1700 MHz, 1900 MHz, and 2100 MHz bands, as examples. The unlicensed bands 110 may comprise bands of the Unlicensed National Information Instructure (UNII), which may include the bands or sub-bands referred to as UNII-1, UNII-2, and UNII-3 in the 5 gigahertz (GHz) band.

The UNII-1 band comprises the frequencies between 5.15 and 5.25 GHz and is limited to a signal strength of 36 dBM effective isotropically radiated power (EIRP). The UNII-2 band comprises the frequencies between 5.25 and 5.35 GHz and is limited to a signal strength of 36 dBM EIRP. The UNII-3 band comprises the frequencies between 5.725 and 5.825 GHz and is limited to a signal strength of 36 dBM EIRP. For purposes of discussion, the UNII-1 and UNII-3 bands will be referred to as high-power bands and the UNII-2 band will be referred to as a low-power band. Generally, the terms "high-power" and "low-power" are used herein to indicate relative signal strengths permissible by governmental regulation in respective frequency bands, where a high-power band allows a higher signal strength than a low-power band. A high-power band generally has a coverage area that is larger than that of a low-power band.

The mobile device 106 identifies itself and authenticate through a control channel in order to authenticate with and attach to the network core 102. The control channel is typically within the licensed bands 108 and is established between the base station 104 and the mobile device 106 in accordance with LTE protocols and standards.

In order to establish a communication session, the base station 104 and/or the mobile device 106 scan available bands to identify one or more operating channels for the mobile device 106 to use. A voice or data session may use multiple communication links, which may include a primary link 116 and one or more supplemental links 118. In certain embodiments, the primary link 116 may use an E-UTRAN channel within the licensed frequency bands 108. The supplemental link 118 may use either an E-UTRAN channel within the licensed bands 108 or a Wi-Fi channel within the unlicensed frequency bands 110.

In some cases, the supplemental link 118 may be used for both uplink and downlink. In other cases, the supplemental link 118 may be used strictly for downlink. Generally, signaling traffic and applications that have strict QoS requirements are routed through an E-UTRAN channel of the licensed frequency bands 108 to ensure higher reliability.

The base station 104 has band selection logic 120 that assigns channels for use in communications between the base station 104 and the mobile device 106. Generally, the band selection logic 120 is configured to scan channels of multiple bands to identify channels that have unused or available bandwidth. In some cases, the band selection logic 120 may then select channels that have the least congestion and that therefore offer the greatest available bandwidth.

The band selection logic 120 may at times, or in certain situations, attempt to use a supplemental link for a communication session, and may attempt to establish the supplemental link 118 through a channel of the unlicensed frequency bands 110. In the example of FIG. 1, the supplemental link 118 may use a channel in a high-power unlicensed band (e.g., UNII-1 or UNII-3) or a low-power unlicensed band (e.g., UNII-2). Channel aggregation techniques are used to implement communications using multiple channels.

When determining whether to assign a channel of high-power unlicensed band or of a low-power unlicensed band for use in transferring data between the base station 104 and the mobile device 106 during a communications session, the base station 104 preferentially assigns a channel from the low-power band, when possible. For example, the base station 104 and/or the mobile device 106 may evaluate signal quality in the low-power band, and if the signal quality is sufficient, the base station 104 selects and assigns a channel of the low-power unlicensed band for use in establishing the supplemental link 118. Otherwise, if there is insufficient signal strength between the base station 104 and the mobile device 106, the base station 104 selects and assigns a channel of the high-power unlicensed band for the supplemental link 118.

Although FIG. 1 shows only a single supplemental link 118, a communication session may at times use multiple supplemental links, which may be from any of the licensed or unlicensed bands. For example, supplemental links for a given communication session may be established using channels of both a high-power unlicensed band and a low-power unlicensed band, particularly in situations in which the low-power unlicensed band is congested.

Although FIG. 1 is described in the context of a cellular communication system or network, the same or similar techniques may be used in other environments and in various types of devices that use unlicensed or other regulated frequency bands. For example, a Wi-Fi access point or other Wi-Fi device may be configured to preferentially use low-power frequency bands to communicate with devices that are within the coverage ranges of the low-power frequency bands.

Figure 2:
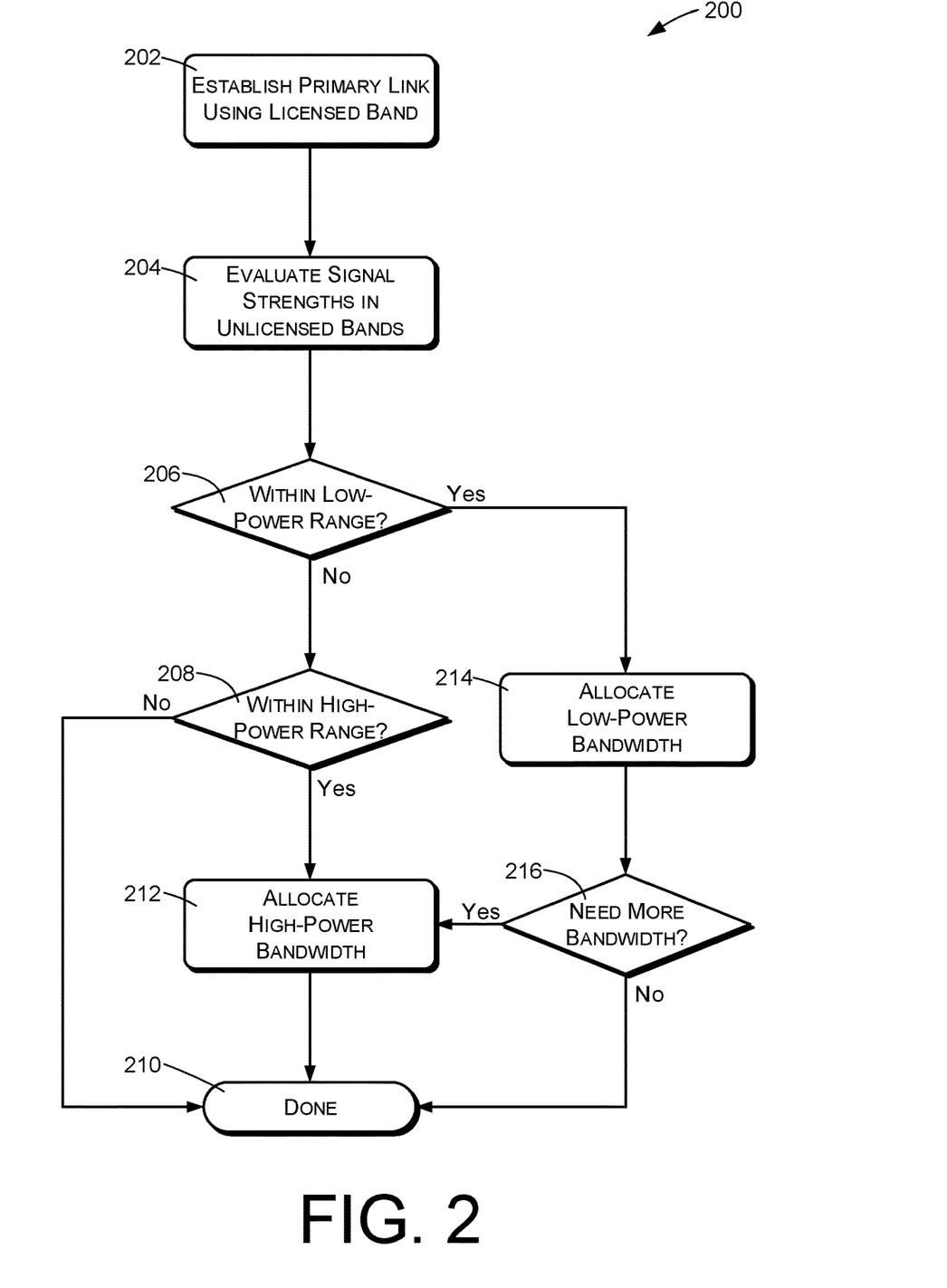
FIG. 2 is a flow diagram illustrating an example method of selecting between available frequency bands for communicating with wireless devices.

FIG. 2 shows an example method 200 of implementing communication sessions with mobile devices and other wireless communication devices. Although the example method 200 will be described in the context of FIG. 1, the method 200 may also be implemented in other environments. For example, the method 200 may be implemented by a Wi-Fi access point or other wireless device that is able to select between low-power and high-power frequency bands.

At least some actions of the example method 200 may be performed multiple times in order to communicate with multiple mobile devices of a mobile communication network. Furthermore, the certain actions of the method 200 may be performed repetitively with respect to a single mobile device in order to accommodate changing conditions.

Generally, communications with the devices use (a) a licensed frequency band, (b) one or more high-power unlicensed frequency bands, and (c) one or more low-power unlicensed frequency bands. The licensed frequency band may comprise a frequency band that is licensed to the operator of the cellular communications network. The unlicensed bands may comprise bands that are legally regulated for shared use by multiple communication networks. In some embodiments, the unlicensed frequency bands may comprise sub-bands of the 5 GHz spectrum defined by the Unlicensed National Information Infrastructure (U-NII).

In LTE systems, communications between the base station and the mobile device use a packet-based protocol such as the Internet Protocol (IP), in which multiple data packets are exchanged with the mobile device. In an LTE system, communications using a licensed band may be carried over the E-UTRAN air interface. Communications through an unlicensed band may be carried over a Wi-Fi or IEEE 802.11 air interface.

Although the method 200 is described as being implemented with one licensed band and two unlicensed bands, the method may be performed using any number of licensed and unlicensed bands, and the unlicensed bands may include any number of high-power bands and low-power bands.

The terms "low-power" and "high-power" are used to indicate relative signal strengths allowed by legal regulation in the frequency bands. UNII bands 1 and 3 are examples of high-power bands. The UNII band 2 is an example of a low-power band. Generally, radio signals within the high-power frequency bands are legally regulated to use no more than a first transmission power and the radio signals within the low-power bands are legally regulated to use no more than a second radio transmission power, where the first radio transmission power is greater than the second radio transmission power.

With respect to a particular base station, each band has a different geographic coverage area, which is typically a function of the radio transmission power. Thus, signals in high-power bands generally have greater range than signals in low-power bands.

An action 202 comprises establishing a primary link between a base station and a mobile device, using a communication channel of a licensed frequency band. E-UTRAN-based communications are used for the primary link, over a licensed frequency band, in order to ensure that control information is reliably exchanged between the base station and the mobile device.

The actions subsequent to the action 202 are performed in order to allocate bandwidth from one or more unlicensed frequency bands for communicating with the mobile device. These actions may be repeated over time to account for changing conditions and changing signal strengths, such as might occur when the mobile device changes location. Because of this repetition, different band allocations for the mobile device may be made at different times.

An action 204 comprises evaluating signal strengths in the different available unlicensed bands, such as the UNII-1, UNII-2, and UNII-3 bands. As already mentioned, one or more of these bands may be high-power bands and one or more of these bands may be low-power bands. The unlicensed bands may be referred to at times as shared frequency bands.

In many cases, channels of high-power bands unlicensed bands will be relatively more congested than channels of low-power bands. Accordingly, subsequent actions of the method 200 implement a band allocation technique that preferentially selects low-power frequency bands over high-power frequency bands.

An action 206 comprises determining whether the mobile device is within the coverage area of a low-power frequency band, and/or that there is an ability to communicate with the mobile device using a low-power frequency band. This may be performed in some embodiments by comparing the signal strengths of a signal in a low-power frequency band to a threshold. For example, the signal strength of a channel signal within a low-power unlicensed frequency band may be compared to a threshold, where the threshold represents the lowest signal strength at which communications are possible with the mobile device. A channel having a signal strength that meets or exceeds the threshold is considered to be capable of being used for communications between the base station and the mobile device. The signal strength can be evaluated at the base station, at the mobile device, or both.

In response to determining that the mobile device is not within the coverage area of a low-power frequency band or that there is an inability to communicate with the mobile device using a low-power frequency band, an action 208 is performed. The action 208 comprises determining whether the mobile device is within the coverage area of a high-power unlicensed frequency band, and/or that there is an ability to communicate with the mobile device using the high-power unlicensed frequency band. This can be performed as described above by comparing the signal strengths to a threshold.

In response to determining that the mobile device is not within the coverage area of a high-power unlicensed frequency band or that there is an inability to communicate with the mobile device using a high-power frequency band, the method 200 terminates, as indicated by the termination block 210. In this case, unlicensed frequency bands are not used for communications between the base station and the mobile device. Note that even though the method 200 terminates at the block 210, the base station may perform other steps to allocate bandwidth from other bands, such as available licensed bands.

In response to determining that the mobile device is within the coverage area of a high-power unlicensed frequency band and/or that there is an ability to communicate with the mobile device using a high-power unlicensed frequency band, an action 212 is performed. The action 212 comprises selecting the high-power power unlicensed frequency band for radio communications with the mobile device. More specifically, the action 212 comprises allocating bandwidth from a channel of the high-power frequency band for use in establishing a supplemental link between the mobile device and the base station. The method 200 terminates after the action 212, as indicated by the block 210.

Moving back to the action 206, in response to determining that the mobile device is within the coverage area of a low-power unlicensed frequency band, and/or that there is an ability to communicate with the mobile device using a low-power unlicensed frequency band, an action 214 is performed, comprising selecting the low-power unlicensed frequency band for radio communications with the mobile device. More specifically, the action 214 may comprise allocating bandwidth from a channel of a low-power unlicensed frequency band for use in forming a supplemental link between the mobile device and the base station.

The amount of bandwidth allocated in the action 214 may depend on the congestion or availability of the channel of the low-power frequency band, which may be affected by the number of other devices that use the channel, including but not limited to other mobile devices that are being supported by the base station. In some cases, the action 214 may comprise allocating bandwidth from channels of two or more low-power unlicensed frequency bands in order to provide a certain overall amount of bandwidth. In this case, data packets are exchanged between the base station and the mobile device over channels of all of the allocated low-power unlicensed frequency bands, as well as any other channels that are being aggregated.

In some cases, an action 216 may be performed after allocating some amount of bandwidth from a channel of the low-power unlicensed frequency band. The action 216 may comprise determining whether additional bandwidth is needed for communicating with the mobile device. If so, the action 212 is performed of allocating additional bandwidth of a channel in a high-power unlicensed frequency band. If no additional bandwidth is needed, the method 200 terminates as indicated by the termination block 210.

In some cases, the action 212 may comprise allocating bandwidth from channels of two or more high-power unlicensed frequency bands in order to provide a desired amount of bandwidth. In this case, data packets are exchanged between the base station and the mobile device over channels of all of the allocated low-power and high-power unlicensed frequency bands, as well as any other channels that are being aggregated.

Actions of the method 200 that follow the action 202 may be performed repeatedly, resulting in dynamic allocation of channels and bandwidth to accommodate changing conditions and signal strengths. For example, during one iteration the method 200 may detect an available and usable channel in a low-power unlicensed band, and may therefore allocate bandwidth from that channel. At a later time, another iteration of the method 200 may fail to detect an available and usable channel in a low-power unlicensed band, and may instead allocate bandwidth from an available channel of a high-power unlicensed band.

The method 200 assumes that the described channels have at least some amount of bandwidth available for allocation. In practice, the base station might implement the method 200 in conjunction with LTE-U and/or LAA techniques and protocols for dynamic channel selection and may use Listen Before Talk (LBT) techniques in order to avoid interference with other users or uses of the unlicensed bands. That is, preferential allocation of channels in low-power bands may be implemented within these techniques and protocols.

Figure 3:
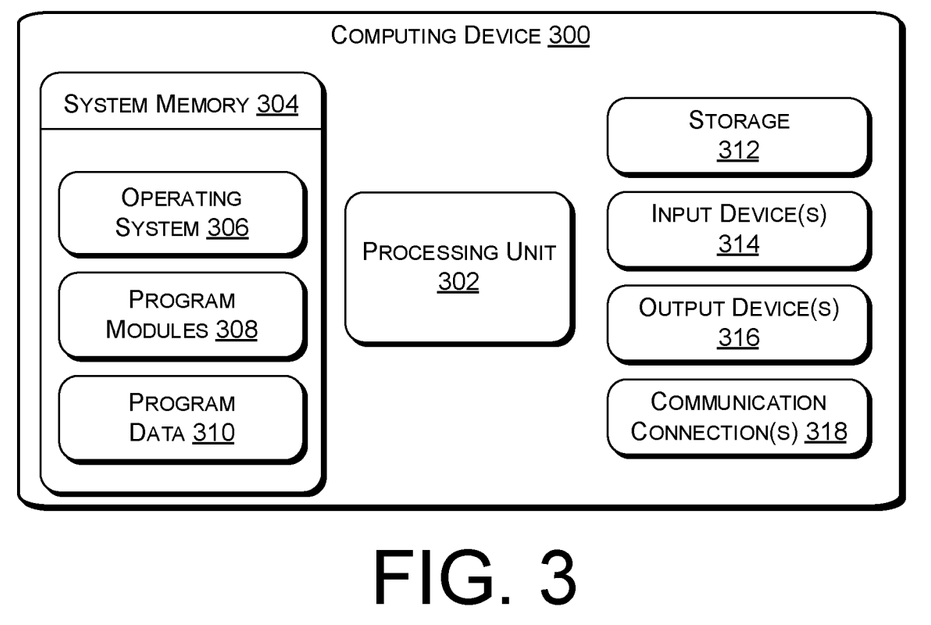
FIG. 3 is a block diagram of an example computing device, one or more of which can be used to implement various of the components and functionality described herein.

FIG. 3 is a block diagram of an illustrative computing device 300 such as may be used to implement various components or functions of the network 100, such as elements of the network core 102 and base station 104. For example, one or more computing devices such as this may be programmed to implement the band selection logic 120 and other functions of the base station 104, including actions described in FIG. 2. Other devices that implement the techniques described herein, such as Wi-Fi access points, may also be implemented at least in part by a computing device such as the computing device 300. In some cases, one or more of the actions may be performed by the mobile device 106.

In various embodiments, the computing device 300 may include at least one processing unit 302 and system memory 304. Depending on the exact configuration and type of computing device, the system memory 304 may be volatile (such as RAM), non-volatile (such as ROM, flash memory, etc.) or some combination of the two. The system memory 304 may include an operating system 306, one or more program modules 308, and may include program data 310.

The computing device 300 may also include additional data storage devices 312 (removable and/or non-removable) such as, for example, magnetic disks, optical disks, or tape.

Non-transitory computer storage media of the computing device 300 may include volatile and nonvolatile, removable and non-removable media implemented in any method or technology for storage of information, such as computer readable instructions, data structures, program modules, or other data.

The system memory 304 and storage devices 312 are examples of non-transitory computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 300.

In various embodiment, any or all of the system memory 304 and storage devices 312 may store programming instructions which, when executed, implement some or all of the functionality described above as being implemented by the base station 104.

The computing device 300 may also have input device(s) 314 such as a keyboard, a mouse, a touch-sensitive display, voice input device, etc. Output device(s) 316 such as a display, speakers, a printer, etc. may also be included. The computing device 300 may also contain communication connections 318 that allow the device to communicate with other computing devices. The communication connections 318 may include interfaces, transceivers and supporting components for communicating with the network core 102 and the mobile device 106. The connections may for example include the E-UTRAN radio transceiver 112.

Figure 4:
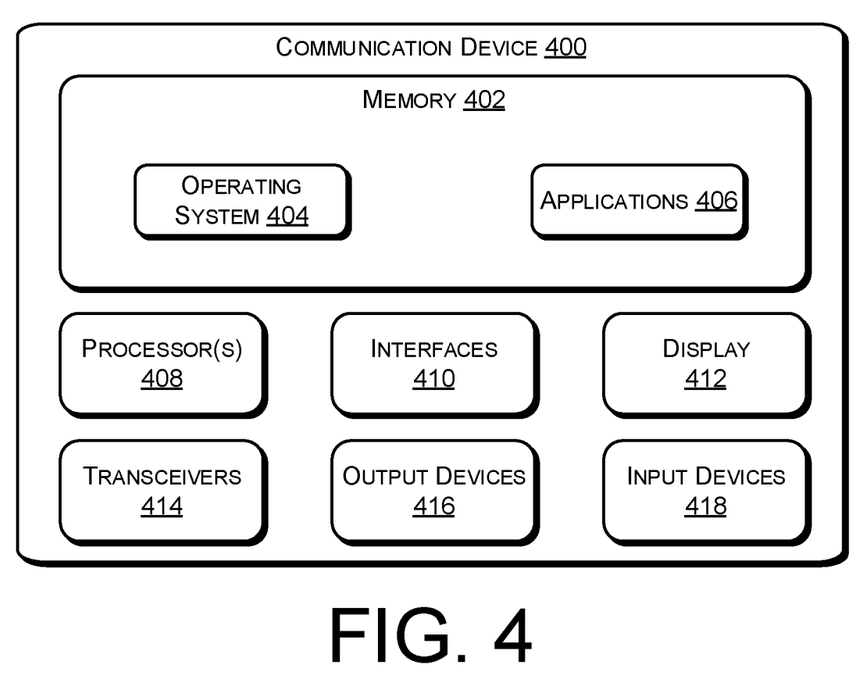
FIG. 4 is a block diagram of a computing device, as an example of a mobile device that may be used in conjunction with the techniques and functionality described herein.

FIG. 4 illustrates an example wireless communication device 400 as an example of the mobile device 106 of FIG. 1. The device 400 may include memory 402, which may store an operating system 404 as well as various applications 406 and associated data. The device 400 has one or more processors 408 for executing the operating system 404 and applications 406. Each processor may comprise a central processing unit (CPU), a graphics processing unit (GPU), or other processing unit or component known in the art.

Generally, the memory 402 stores one or more sets of instructions (e.g., software) such as a computer-executable program that embodies operating logic for implementing and/or performing any one or more of the methodologies or functions described herein as being performed by the mobile device 106. For example, in some embodiments certain of the actions shown in FIG. 2 may be performed by the mobile device 106.

In various embodiments, the memory 402 may include both volatile memory and non-volatile memory. The memory 402 can also be described as non-transitory computer storage media/memory, machine-readable media/memory, or computer-readable media/memory, and may include removable and non-removable media implemented in any method or technology for storage of information, such as computer readable instructions, data structures, program modules, or other data.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 400.

The device 400 may have interfaces 410 such as are known in the art. The interfaces 410 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the device 400 may have a display 412 such as a liquid crystal display or any other type of display commonly used in telecommunication devices or other portable devices. For example, the display 412 may be a touch-sensitive display screen, which may also act as an input device or keypad, such as for providing a soft-key keyboard, navigation buttons, or the like.

The device 400 may also include one or more transceivers 414, which may include any sort of transceivers known in the art. For example, the transceivers 414 may include radio radios and/or radio transceivers and interfaces that perform the function of transmitting and receiving radio frequency communications via an antenna, through a cellular communication network of a cellular communications carrier.

The communication device 400 may have output devices 416, which may include any sort of output devices known in the art, such as a display (already described as display 412), speakers, a vibrating mechanism, or a tactile feedback mechanism. The output devices 416 also include ports for one or more peripheral devices, such as headphones, peripheral speakers, or a peripheral display.

The communication device 400 may have input devices 418, which may include any sort of input devices known in the art. For example, the input devices 418 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

The invention claimed is:

1. One or more non-transitory computer-readable media storing computer-executable instructions that, when executed by one or more processors, cause the one or more processors to perform actions comprising:
communicating with multiple mobile devices of a cellular communication network, wherein communicating with the mobile devices is performed at least in part using (a) a licensed frequency band licensed to an operator of the cellular communication network, (b) a first unlicensed frequency band having a first coverage range, and (c) a second unlicensed frequency band having a second coverage range; the first and second unlicensed frequency bands being legally regulated for shared use by multiple communication networks;
wherein radio signals within the first shared unlicensed frequency band are legally regulated to use no more than a first radio transmission power and radio signals within the second shared unlicensed frequency band are regulated to use no more than a second radio transmission power, the first radio transmission power being greater than the second radio transmission power;
determining that a mobile device is within the second coverage range, wherein a time that the determining that the mobile device is within the second coverage range is performed is a first time;
in response to determining that the mobile device is within the second coverage range, selecting the second shared unlicensed frequency band for radio communications with the mobile device;
determining that the mobile device is not within the second coverage range, wherein a time that the determining that the mobile device is not within the second coverage range is performed is a second time; and in response to determining that the mobile device is not within the second coverage range, selecting the first shared unlicensed frequency band for radio communications with the mobile device, wherein the first time is different than the second time.

2. The one or more non-transitory computer-readable media of claim 1, wherein the first coverage range is greater than the second coverage range.

3. The one or more non-transitory computer-readable media of claim 1, wherein communications over the first and second unlicensed frequency bands use an IEEE 802.11 communications protocol.

4. The one or more non-transitory computer-readable media of claim 1, the actions further comprising:

communicating with the mobile device using a packet-based protocol in which multiple data packets are exchanged with the mobile device;

in further response to determining that the mobile device is within the second range, exchanging some of the multiple data packets with first mobile device over a first communication channel within the first unlicensed frequency band;

wherein others of the multiple data packets are exchanged with the mobile device over a second communication channel within the licensed frequency band.

5. The one or more non-transitory computer-readable media of claim 1, the actions further comprising:

communicating with the mobile device using a packet-based protocol in which multiple data packets are exchanged with the mobile device;

in further response to determining that the mobile device is within the second range, exchanging some of the multiple data packets with the mobile device over a first communication channel within the first unlicensed frequency band;

wherein others of the multiple data packets are exchanged with the mobile device over a second communication channel within the second unlicensed frequency band.

6. The one or more non-transitory computer-readable media of claim 1, wherein the first and second unlicensed frequency bands are in a 5 GHz spectrum of a Unlicensed National Information Infrastructure (U-NII).

7. A base station for use within a cellular communication system, the base station comprising:

one or more radio transceivers configured to communicate with multiple devices of the cellular communication system at least in part using a first frequency band and a second frequency band;

wherein radio signals within the first frequency band are legally regulated to use no more than a first transmission power and radio signals within the second frequency band are legally regulated to use no more than a second radio transmission power, the first radio transmission power being greater than the second radio transmission power;

one or more processors;

one or more non-transitory computer-readable media storing computer-executable instructions that, when executed by the one or more processors, cause the one or more processors to perform actions comprising:

determining an ability to communicate with a device using the second frequency band, wherein a time that the determining the ability to communicate with the device using the second frequency band is performed is a first time;

in response to determining the ability to communicate with the device using the second frequency band, preferentially selecting the second frequency band over the first frequency band for communicating with the device;

determining an inability to communicate with the device using the second frequency band, wherein a time that the determining the inability to communicate with the device using the second frequency band is performed is a second time; and in response to determining the inability to communicate with the device using the second frequency band, using the first frequency band for communicating with the device, wherein the first time is different than the second time.

8. The base station of claim 7, wherein the first and second unlicensed frequency bands are in a 5 GHz spectrum of a Unlicensed National Information Infrastructure (U-NII).

9. The base station of claim 7, wherein the first and second frequency bands are legally regulated for shared use by multiple communication networks.

10. The base station of claim 7, the actions further comprising:

communicating with the device using a packet-based protocol;

in further response to determining the ability to communicate with the device using the second frequency band, exchanging some of the multiple data packets with the device over a first communication channel within the second unlicensed frequency band; and wherein others of the multiple data packets are exchanged with the device over a second communication channel within a licensed frequency band.

11. The base station of claim 7, wherein communications over the first and second unlicensed frequency bands use an IEEE 802.11 communications protocol.

12. A method, comprising:

communicating with multiple devices at least in part using a first frequency band and a second frequency band, wherein radio signals within the first frequency band use no more than a first radio transmission power and radio signals within the second frequency band use no more than a second radio transmission power, the first radio transmission power being greater than the second radio transmission power;

determining an ability to communicate with a device using the second frequency band, wherein a time that the determining the ability to communicate with the device using the second frequency band is performed is a first time;

in response to determining the ability to communicate with the device using the second frequency band, using the second frequency band preferentially over the first frequency band for communicating with the device;

determining an inability to communicate with the device using the second frequency band, wherein a time that the determining the inability to communicate with the device using the second frequency band is performed is a second time; and in response to determining the inability to communicate with the device using the second frequency band, using the first frequency band for communicating with the device, wherein the first time is different than the second time.

13. The method of claim 12, wherein the first and second frequency bands are of a Unlicensed National Information Infrastructure (UNII).

14. The method of claim 12, wherein the second frequency band is legally regulated to use no more than the second radio transmission power.

15. The method of claim 12, wherein the first and second frequency bands are legally regulated for shared use by multiple communication networks.

16. The method of claim 12, further comprising communicating with the device using a packet-based protocol in which multiple data packets are exchanged with the device.

17. The method of claim 12, wherein communications over the first and second unlicensed frequency bands use an IEEE 802.11 communications protocol.

\* \* \* \* \*